Figure 1:
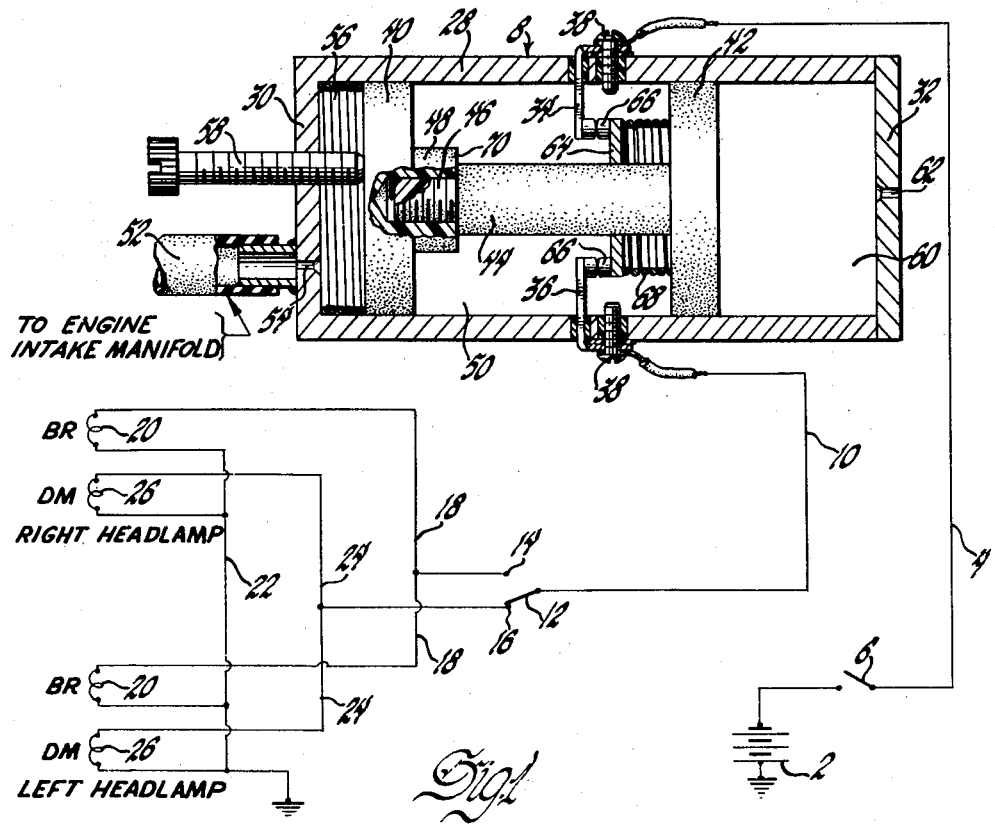

Oct. 23, 1962     R. H. GAGAN     3,060,290

TIME DELAY SWITCH

Filed May 4, 1959

INVENTOR.
Richard H. Gagan
BY
S. E. McGlynn Jr.
ATTORNEY

United States Patent Office 3,060,290
Patented Oct. 23, 1962

3,060,290
TIME DELAY SWITCH
Richard H. Gagan, Milwaukee, Wis., assignor to General Motors Corporation, Detroit, Mich., a corporation of Delaware
Filed May 4, 1959, Ser. No. 810,694
6 Claims. (Cl. 200—82)

This invention relates to a fluid pressure responsive time delay switch for an electrical circuit and, in particular, to such a switch adapted to be connected in an electrical circuit of an automotive vehicle and operated in response to a control pressure indicative of engine operation such as, for example, absolute manifold pressure.

The present invention has particular utility, generally speaking, as a means for controlling the flow of current through an electrical circuit in response to the generation or loss of a control pressure occasioned by the operation of some control means with respect to which the circuit is intended to be controlled. More particularly, such a switch finds particular utility as a means for automatically controlling the opening and closing of an electrical circuit of an automotive vehicle such as, for example, an automotive vehicle lighting circuit or circuits or an accessory circuit for electric windshield wipers, a radio, heater or the like.

With respect to the use of such a switch with automotive vehicles, such vehicles are, of course, provided with suitable circuitry under the control of a manually operable switch or switches to control illumination of headlamps, tail lamps and other lighting devices, and the various accessories aforementioned. A great number of vehicle operators have experienced the unfortunate situation in which they turn off the engine ignition to stop the engine, park the car and leave the vehicle with a lighting device or devices or an accessory still energized in the electrical circuitry. As will be appreciated, upon returning to his vehicle, the operator often finds that he is unable to start it because his battery has run down to the drain thereon.

It is a principal object and feature of this invention to provide a fluid pressure responsive time delay switch for an electrical circuit which, in response to the presence of a particular control pressure, will close or make the electrical circuit but which, after a predetermined time interval after sensing the loss of such control pressure, will act automatically to break the circuit.

Another object and feature of this invention is to provide such a time delay switch having relatively movable switch or contact members adapted to make or break a particular electrical circuit controlling the energization of vehicle lamps, accessories and the like in response to the presence or absence of absolute engine manifold pressure signifying whether or not the vehicle engine is operating.

It is yet another object and feature of this invention to incorporate in the aforementioned switch a time delay feature whereby, after turning the engine off, a predetermined time delay results prior to de-energization of the circuit in which the switch is connected.

In general, these and other objects of this invention are attained in a preferred embodiment thereof by means of a time delay switch comprising a fixed housing having piston means reciprocably disposed therein and defining with the latter a motor chamber and an opposed time delay chamber. Means is provided to communicate the motor chamber with such as the air intake manifold of an internal combustion engine while a small orifice communicates the time delay chamber with atmosphere, and a spring is placed in the motor chamber to act against the piston means. Fixed contact means are mounted within the housing so as to cooperate with movable contact means relatively movably supported on the piston means to make or break the particular circuit in which the switch is connected. When manifold vacuum or a relatively low absolute manifold pressure is present, the piston means of the switch is movable in one direction so as to engage the respective contact means to make the circuit and, upon the loss of manifold vacuum or the presence of a relatively high manifold pressure, the piston means is movable slowly in the opposite direction in accordance with the flow of air through the orifice means communicating with the time delay chamber to break contact engagement and, therefore, the circuit. During movement of the piston means in the circuit-breaking direction, means are provided to maintain the respective switch contacts in circuit-making engagement until the piston means has moved to a predetermined extent.

Figure 2:
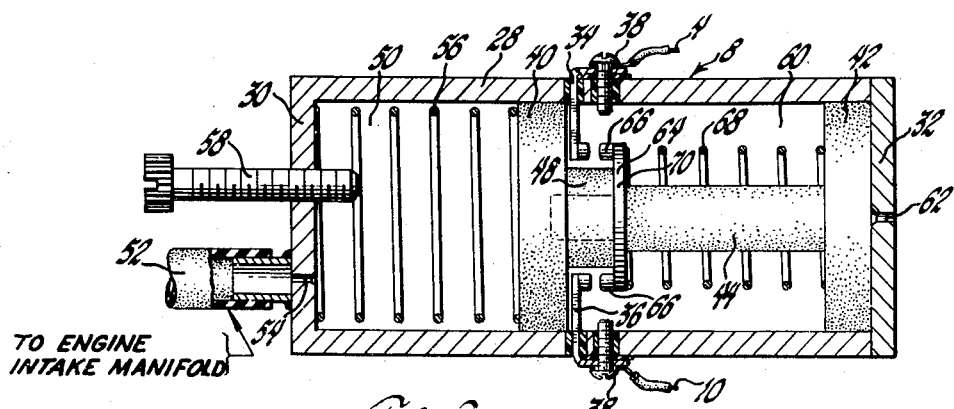

The objects of this invention and the manner in which they are obtained will become more readily apparent hereinafter as the description of the invention proceeds, and in which reference is made to the drawing in which:

FIGURE 1 is a view of a preferred embodiment of this invention with the time delay switch in a circuit-closing position; and FIGURE 2 is a view similar to FIGURE 1 but showing the switch in a circuit-opening position.

Referring now to the drawings, a preferred embodiment of the invention is illustrated in an electrical circuit which controls the operation of the headlamps of an automotive vehicle. However, as the description proceeds, it will be readily apparent that the time delay switch of this invention may be used in other circuits and, particularly, various accessory circuits normally employed in automotive vehicles.

The headlamp circuit shown in FIGURE 1 comprises a source of electrical power 2, such as a vehicle battery, connected by the conductor 4 in series with the master headlamp switch 6 and one terminal of the time delay switch indicated generally at 8. Electrical power is adapted to be transmitted through the time delay switch 8 by means to be described to the conductor 10 and thence to the dimmer switch indicated at 12. The dimmer switch may be of any conventional construction and, it will be understood, is adapted to be moved between positions respectively closing the contact terminals 14 and 16. The contact 14 is connected in parallel to the conductors 18 to illuminate the upper beam or bright filaments 20 of the right and left hand headlamps, the circuits being completed through the common conductor 22 to ground. In similar fashion, the contact 16 when closed energizes the conductors 24 to illuminate the lower beam or dim filaments 26 of the right and left headlamps, the circuit being completed through the ground conductor 22.

The time delay switch 8 comprises a fixed housing 28 which is preferably of cylindrical shape and enclosed by the oppositely disposed end walls 30 and 32. Oppositely disposed contacts 34 and 36 are rigidly secured to the side wall of the housing 28 and project into the interior of the latter. These contact members are suitably insulated from the housing as shown in the drawings, and secured to the housing by suitable fasteners such as the screws 38 which are also insulated from the housing. The conductors 4 and 10 are secured under the respective heads of the fasteners 38, and are electrically connected to the contacts 34 and 36.

A double-headed piston is axially reciprocably disposed within the interior of the housing 28, and includes a pair of axially spaced piston heads 40 and 42 fixed in axially spaced relationship by a piston rod 44 preferably formed integral with the piston head 42 and screw-threaded or otherwise rigidly secured to the piston head 40 by means of the threaded shank 46 entering the boss 48 on the piston head 40. The piston heads and their common connecting piston rod are fabricated from a suitable insulating material.

The face of the piston head 40 opposite the piston rod 44 defines with the walls of the housing 28 a variable volume motor chamber 50 adapted to be placed in communication with an engine air intake manifold by means of a suitable conduit 52 communicating with an orifice 54 in the housing wall 30. A yieldable axially coiled spring 56 is mounted within the motor chamber 50 and acts between the housing wall 30 and the face of piston head 40 to yieldably oppose movement of the piston means to the left in the drawing in response to the presence of manifold vacuum in the engine, while continuously urging the piston means to the right toward the position shown in FIGURE 2 of the drawings when no manifold vacuum is present. An adjustable stop screw 58 is threadably received within the housing wall 30 to abut the face of the piston head 40 to limit leftward travel thereof and, as a consequence thereof and as will appear hereinafter, for the purpose of adjusting the time delay interval of the switch. The face of the piston head 42 opposite the piston rod 44 defines with the walls of the housing 28 a variable volume time delay chamber 60 which continuously communicates with atmosphere by means of an orifice 62 formed in the housing wall 32.

A bridging switch or contact member 64 is relatively axially slidable disposed about the piston rod 44 and includes contact means 66 in axial alignment with the fixed contacts 34 and 36. A spring 68 is coiled about the piston rod 44 and acts between the piston head 42 and the movable contact member 64 to continuously urge the latter to the left in the drawings for cooperating circuit-closing engagement with the fixed contact members 34 and 36. It will be noted that an annular shoulder 70 on the boss 48 of greater diameter than the piston rod 44 is adapted to engage the movable contact member 64 after a predetermined extent of movement of the piston means to the right relative to the housing 28. As a result, and as shown in FIGURE 2, a predetermined movement of the piston means to the right in response to the loss of manifold vacuum results in engagement of the shoulder 70 with the contact 64 to move the latter out of circuit-making engagement with the fixed contact members 34 and 36.

With respect to a description of the operation of this invention, it may be assumed that the vehicle engine is operating, that the master headlamp switch 6 is closed and that the dimmer switch 12 is in one or the other of its possible positions. At this time, the lamps are illuminated, and the switch 8 is disposed in the position shown in FIGURE 1. The manifold vacuum or relatively low absolute manifold pressure resulting from operation of the engine comunicates through the conduit 52 with the motor chamber 50 to draw the piston means to the FIGURE 1 position, while air at atmospheric pressure enters the time delay chamber 60 through the orifice 62. At this juncture, it should be noted that the small orifice 54 may be eliminated to provide free communication from the engine manifold to the motor chamber 50. However, a restriction of this type is preferred since it will effectively eliminate undesired shifting or hunting of the piston means within its housing in response to periodic and sporadic loading of the engine.

It may now be assumed that the vehicle operator parks, turns off his engine and leaves the vehicle with the headlamp switch 6 closed. As soon as the engine is stopped, there is a marked decrease of manifold vacuum or increase in absolute manifold pressure communicated to the motor chamber 50. Due to the effect of this change in pressure and the influence of the spring 56, the piston means begins to reciprocate to the right or toward the final position of FIGURE 2. Naturally, this movement is relatively slow inasmuch as it is opposed by the air trapped within the time delay chamber 60 and escaping through the small bleed orifice 62. As the piston moves to the right, the spring 68 gradually expands and maintains the movable contact members 66 in circuit-closing engagement with the fixed contact members 34 and 36 while the piston rod moves relative thereto. Upon movement of the piston means to a predetermined extent, the movable switch member 64 is picked up or engaged by the annular shoulder 70 and the piston is disposed in the FIGURE 2 position with the face of the piston head 42 bottomed against the housing wall 32 and the contact members 34, 36 and 66 is a circuit-opening position. As a result, the circuit to the lamps is broken although switch 6 is closed.

It will be noted that the time delay after shutting off the engine before the lighting circuit is broken will depend upon the distance which the piston means must travel between the FIGURE 1 and the FIGURE 2 positions. Accordingly, this time delay interval may be adjusted as desired by means of the adjusting screw 58 to limit movement of the piston means to the left in response to manifold vacuum.

Should the vehicle operator now return and start his engine, the presence of manifold vacuum reciprocates the piston to the FIGURE 1 position to close the circuit relatively instantaneously so that the headlamps are now in condition for use again should the operator retain switch 6 in the closed position. In this regard, it should be noted from a comparison of FIGURES 1 and 2 of the drawing that the piston means need only to move a slight amount to the left in order to close the circuit.

While but one form of the invention has been selected for a descriptive illustration thereof, other embodiments will be apparent to those skilled in the art. Therefore, the embodiment shown in the drawing is merely for illustrative purposes, and is not intended to limit the scope of the invention which is defined by the claims which follow.

I claim:
1. A fluid pressure responsive time delay switch for an electrical circuit comprising a fixed housing, piston means reciprocably disposed within said housing and defining with the latter a motor chamber and an opposed time delay chamber, means communicating said motor chamber with a source of fluid pressure to reciprocate said piston means in one direction, spring means yieldably opposing movement of said piston means in said one direction and urging said piston means in the opposite direction, fixed circuit contact means secured within said housing, axially spaced abutments on said piston means, movable circuit contact means relatively reciprocably mounted on said piston means between said abutments, and spring means acting between one of said abutments and said movable contact means to urge the latter toward circuit closing engagement with said fixed contact means, said other abutment being engageable with said movable contact means to move the latter out of circuit closing engagement with said fixed contact means after movement of said piston means to a predetermined extent in said opposite direction.

2. A fluid pressure responsive time delay switch for an electrical circuit comprising a fixed housing, piston means reciprocably disposed within said housing and defining with the latter a motor chamber and an opposed time delay chamber, means communicating said motor chamber with a source of fluid pressure to reciprocate said piston means in one direction, adjustable stop means limiting reciprocation of said piston means in said one direction, spring means mounted in said motor chamber and yieldably opposing movement of said piston means in said one direction and urging said piston means in the opposite direction, fixed circuit contact means secured within said housing, axially spaced abutments on said piston means, movable circuit contact means relatively reciprocably mounted on said piston means between said abutments, and spring means acting between one of said abutments and said movable contact means to urge the latter toward circuit closing engagement with said fixed contact means during movement of said piston means in said one direction and for a predetermined extent of movement of said piston means in said opposite direction, said other abutment being engageable with said movable contact means to move the latter out of circuit closing engagement with said fixed contact means after movement of said piston means to said predetermined extent in said opposite direction.

3. A fluid pressure responsive time delay switch for an electrical circuit comprising a fixed housing, piston means comprising first and second axially spaced piston heads reciprocably disposed within said housing, a piston rod secured between said piston heads, said piston heads opposite said rod respectively defining with said housing a motor chamber and a time delay chamber, means communicating said motor chamber with a source of fluid pressure to reciprocate said piston means in one direction, spring means yieldably opposing movement of said piston means in said one direction and urging said piston means in the opposite direction, an orifice communicating said time delay chamber to atmosphere, fixed circuit contact means secured within said housing between said piston heads, movable circuit contact means relatively axially movably supported on said piston rod, spring means acting between one of said piston heads and said movable contact means to urge the latter into circuit closing engagement with said fixed contact means, and abutment means adjacent said other piston head and being engageable with said movable contact means to move the latter out of circuit closing engagement with said fixed contact means after movement of said piston means to a predetermined extent in said opposite direction.

4. A fluid pressure responsive time delay switch for an electrical circuit comprising a fixed housing, piston means comprising first and second axially spaced piston head reciprocably disposed within said housing, a piston rod secured between said piston heads, said piston heads opposite said rod respectively defining with said housing a motor chamber and a time delay chamber, means communicating said motor chamber with a source of fluid pressure to reciprocate said piston means in one direction, adjustable stop means limiting reciprocation of said piston means in said one direction, spring means mounted in said motor chamber and yieldably opposing movement of said piston means in said one direction and urging said piston means in the opposite direction, an orifice communicating said time delay chamber to atmosphere, fixed circuit contact means secured within said housing between said piston heads, movable circuit contact means relatively axially movably supported on said piston rod, spring means acting between one of said piston heads and said movable contact means to urge the latter into circuit closing engagement with said fixed contact means during movement of said piston means in said one direction and for a predetermined extent of movement of said piston means in said opposite direction, and abutment means adjacent said other piston head and being engageable with said movable contact means to move the latter out of circuit closing engagement with said fixed contact means after movement of said piston means to said predetermined extent in said opposite direction.

5. In a vehicle comprising a combustion engine having an air intake manifold, and an electrical control circuit, the improvement comprising a time delay switch in said circuit and responsive to manifold pressure to make and break said circuit; said switch comprising a fixed housing, piston means reciprocably disposed within said housing and defining with the latter a motor chamber and an opposed time delay chamber, means communicating said motor chamber with a source of fluid pressure to reciprocate said piston means in one direction, adjustable stop means in said motor chamber limiting reciprocation of said piston means in said one direction, spring means mounted in said motor chamber and yieldably opposing movement of said piston means in said one direction and urging said piston means in the opposite direction, fixed circuit contact means secured within said housing, axially spaced abutments on said piston means, movable circuit contact means relatively reciprocably mounted on said piston means between said abutments, and spring means acting between one of said abutments and said movable contact means to urge the latter toward circuit closing engagement with said fixed contact means during movement of said piston means in said one direction and for a predetermined extent of movement of said piston means in said opposite direction, said other abutment being engageable with said movable contact means to move the latter out of circuit closing engagement with said fixed contact means after movement of said piston means to said predetermined extent in said opposite direction.

6. In a vehicle comprising a combustion engine having an air intake manifold, and an electrical control circuit, the improvement comprising a time delay switch in said circuit responsive to manifold pressure to make and break said circuit; said switch comprising a fixing housing, piston means comprising first and second axially spaced piston heads reciprocably disposed within said housing, a piston rod secured between said piston heads, said piston heads opposite said rod respectively defining with said housing a motor chamber and a time delay chamber, means communicating said motor chamber with a source of fluid pressure to reciprocate said piston means in one direction, adjustable stop means in said motor chamber limiting reciprocation of said piston means in said one direction, spring means mounted in said motor chamber and yieldably opposing movement of said piston means in said one direction and urging said piston means in the opposite direction, an orifice communicating said time delay chamber to atmosphere, fixed circuit contact means secured within said housing between said piston heads, movable circuit contact means relatively axially movably supported on said piston rod, spring means acting between one of said piston heads and said movable contact means to urge the latter into circuit closing engagement with said fixed contact means, and abutment means adjacent said other piston head engageable with said movable contact means to move the latter out of circuit closing engagement with said fixed contact means after movement of said piston means to a predetermined extent in said opposite direction.

References Cited in the file of this patent
UNITED STATES PATENTS

| | | |
|---|---|---|
| 1,507,193 | May et al. | Sept. 2, 1924 |
| 1,641,720 | Widmer | Sept. 6, 1927 |
| 2,182,816 | Moffett | Dec. 12, 1939 |
| 2,191,381 | Hanson | Feb. 20, 1940 |
| 2,335,073 | Martin et al. | Nov. 23, 1943 |
| 2,543,090 | Ballou | Feb. 27, 1951 |
| 2,794,868 | McMorran et al. | June 4, 1957 |
| 2,804,513 | Oppel | Aug. 27, 1957 |
| 2,866,862 | Bachi | Dec. 30, 1958 |
| 2,870,753 | Shuck et al. | Jan. 27, 1959 |

UNITED STATES PATENT OFFICE
CERTIFICATE OF CORRECTION

Patent No. 3,060,290                           October 23, 1962

Richard H. Gagan

It is hereby certified that error appears in the above numbered patent requiring correction and that the said Letters Patent should read as corrected below.

Column 1, line 41, after "down" insert -- due --; column 3, line 30, for "slidable" read -- slidably --; line 45, after "contact" insert -- member --; column 5, line 39, for "head" read -- heads --.

Signed and sealed this 2nd day of April 1963.

(SEAL)
Attest:

ESTON G. JOHNSON                          DAVID L. LADD

Attesting Officer                          Commissioner of Patents